US007259732B2

(12) United States Patent
Allen et al.

(10) Patent No.: US 7,259,732 B2
(45) Date of Patent: Aug. 21, 2007

(54) COSMETIC ENHANCEMENT MIRROR

(75) Inventors: Paul G. Allen, Seattle, WA (US); Edward K. Y. Jung, Bellevue, WA (US); Royce A. Levien, Lexington, MA (US); Mark A. Malamud, Seattle, WA (US); John D. Rinaldo, Jr., Bellevue, WA (US)

(73) Assignee: Searete LLC, Bellevue, WA (US)

( * ) Notice: Subject to any disclaimer, the term of this patent is extended or adjusted under 35 U.S.C. 154(b) by 13 days.

(21) Appl. No.: 11/478,334

(22) Filed: Jun. 28, 2006

(65) Prior Publication Data

US 2007/0013612 A1 Jan. 18, 2007

Related U.S. Application Data

(60) Division of application No. 10/912,271, filed on Aug. 5, 2004, now Pat. No. 7,133,003, and a continuation-in-part of application No. 10/910,421, filed on Aug. 2, 2004.

(51) Int. Cl.
*G09G 3/00* (2006.01)

(52) U.S. Cl. ........................................ 345/32; 345/156

(58) Field of Classification Search .................... 345/8, 345/32, 156; 132/301; 434/371; D28/64.1
See application file for complete search history.

(56) References Cited

U.S. PATENT DOCUMENTS 3,838,525 A 10/1974 Harvey
3,934,226 A 1/1976 Stone et al.
5,198,936 A 3/1993 Stringfellow
5,997,149 A 12/1999 Chu
6,032,119 A 2/2000 Brown et al.
6,071,236 A 6/2000 Iliff
6,095,985 A 8/2000 Raymond et al.
6,120,467 A 9/2000 Schallhorn
6,238,337 B1 5/2001 Kambhatla et al.
6,272,468 B1 8/2001 Melrose
6,322,502 B1 11/2001 Schoenberg et al.
6,336,900 B1 1/2002 Alleckson et al.
6,402,689 B1 6/2002 Scarantino et al.
6,440,090 B1 8/2002 Schallhorn
6,454,708 B1 9/2002 Ferguson et al.
6,468,263 B1 10/2002 Fischell et al.
6,516,210 B1 2/2003 Foxall
6,542,204 B1 4/2003 Ohzawa et al.
6,556,977 B1 4/2003 Lapointe et al.
6,569,094 B2 5/2003 Suzuki et al.
6,574,742 B1 6/2003 Jamroga et al.
6,678,703 B2 1/2004 Rothschild et al.

(Continued)

FOREIGN PATENT DOCUMENTS

JP 05181216 A2 7/1993

(Continued)

OTHER PUBLICATIONS

Azuma, Ronald; Baillot, Yohan; Behringer, Reinhold; Feiner Steven; Julier, Simon, MacIntyre, Blair; "Recent Advances in Augmented Reality," pp. 34-47; located at www.cs.unc.edu/~azuma/cga2001.pdf; bearing a date of Nov./Dec. 2001; printed on Jul. 12, 2004.

(Continued)

*Primary Examiner*—Ricardo Osorio

(57) ABSTRACT

Cosmetic enhancement mirror methods and related systems.

31 Claims, 12 Drawing Sheets

100 Light Reflecting Structure/ Surface
102 Image Capture Device
104 Input Capture Device
106 Data Presentation Device
210 Captured Input Storage Device
200 Image Transmission Device
212 Surgeon's System (e.g., Cosmetic Surgeon)
202 Image Storage Device_1
204 Image Storage Device_2
206 Image Storage Device_3
208 Image Sorting Engine

U.S. PATENT DOCUMENTS

| | | | | |
|---|---|---|---|---|
| 6,710,927 | B2 | 3/2004 | Richards | |
| 6,725,200 | B1 | 4/2004 | Rost | |
| 6,746,122 | B2 | 6/2004 | Knox | |
| 6,755,539 | B2 | 6/2004 | Brennesholtz | |
| 6,757,087 | B1 | 6/2004 | Taketomi et al. | |
| 6,760,515 | B1 | 7/2004 | Wang et al. | |
| 6,761,458 | B2 | 7/2004 | Sakata et al. | |
| 6,762,870 | B2 | 7/2004 | De Vaan | |
| 6,774,869 | B2 * | 8/2004 | Biocca et al. | 345/8 |
| 2001/0031081 | A1 * | 10/2001 | Quan et al. | 382/154 |
| 2001/0037191 | A1 * | 11/2001 | Furuta et al. | 703/6 |
| 2002/0196333 | A1 * | 12/2002 | Gorischek | 348/61 |
| 2003/0041871 | A1 * | 3/2003 | Endo et al. | 132/301 |
| 2004/0095359 | A1 | 5/2004 | Simon et al. | |
| 2005/0185278 | A1 * | 8/2005 | Horsten et al. | 359/487 |

FOREIGN PATENT DOCUMENTS

| | | | |
|---|---|---|---|
| JP | 06055957 | A2 | 3/1994 |
| WO | WO 02/080773 | A1 | 10/2002 |

OTHER PUBLICATIONS

Butz, Andreas; Beshers, Clifford; Feiner, Steven; "Of Vampire Mirrors and Privacy Lamps: Privacy Management in Multi-User Augmented Environments," pp. 171-172; located at http://wwwl.cs.columbia.edu/~butz/publications/papers/uist98.pdf; bearing a date of Nov. 2-4, 1998; printed on Jul. 12, 2004.

Computer Vision & Robotics Laboratory Beckman Institute, "Multiview Mirror Pyramid Panoramic Cameras," Tan, Kar-Han; Hua, Hong; Ahuja, Narendar from the Beckman Institute for Advanced Science and Technology, University of Illionois at Urbana-Champaign, pp. 1-4 located at http://vision.ai.uiuc.edu/~tankh/Camera/camera.html printed on Aug. 9, 2004.

Francois, Alexandre R.J.; Kang, Elaine; "The Virtual Mirror," pp. 1-5; located at http://iris.usc.edu/~afrancoi/virtual_mirror/; printed on Jul. 12, 2004.

Fulford, Benjamin, "Adventures in the Third Dimension"pp. 1-3 located at www.forbes.com/forbes/2004/0524/166_print.html bearing a date of May 24, 2004 and printed on Sep. 1, 2004.

Healthy Style Products, "Emjoi—The Mirror AP-13," pp. 1-2 located at http://www.healthystyleproducts.com/mirror.html printed on Sep. 1, 2004.

Highbeam Research; "Winntech. (Globalshop 2003 Spotlight);" pp. 1; located at http://www.highbeam.com/library/doc0.asp?docid=IGI:99048681&refid=ink_g5sl&skeyw; printed on Jul. 12, 2004.

Lin, I-Chen; Yeh, Jeng-Sheng; and Ouhyoung, Ming from National Taiwan University, "Extracting 3D Facial Animation Parameters from Multiview Video Clips," pp. 2-10, bearing a date of Nov./Dec. 2002 and printed on Sep. 1, 2004.

Lin, I-Chen, "The Software Tool of Mass 3D Facial Animation Parameter Extraction from Mirror-Reflected Multi-View Video User's Instruction Version 1.0," located at http://www.cmlab.csie.ntu.edu.tw/~ichen, pp. 1-24 (+cover sheet), printed on Sep. 1, 2004.

Morimoto, Carlos Hitoshi; "Interactive Digital Mirror," from XIV Brazilian Symposium on Computer Graphics and Image Processing (SIBGRAPI'01), Oct. 15-18, 2001; pp. 1; located at http://csdl.computer.org/comp/proceeding/sibgrapi/2001/1330/00/13300232abs.htm; bearing a date of 2001; printed on Jul. 12, 2004.

NEXTAG, "Accessories—compare prices, review and buy a NexTag—Price—Review re Jerdon Mirror," pp. 1-2 located at http://www.nextag.com/Jerdon_Accessories~2702144zJerdonz0zB36ozmainz5-htm printed on Aug. 9, 2004.

NP Review Info, "New Product Reviews: New New Product Review—Jerdon JGL9W 5X Magnification Tri-fold Lighted Mirror Product Review," pp. 1-3 located at http://www.npreview.info/Home-and-Garden/Home-Decor/Mirrors/Vanity-Mirrors/Jerdon-JGL9W-5X-Magnification-Tri-fold-Lighted-Mirror.html printed on Sep. 1, 2004.

PCT International Search Report; International App. No.: PCT/US05/27410; Jan. 27, 2006.

Radford, Tim, "Mirror, Mirror on the Wall, Who'll Be Fattest of Them All?", The Guardian Unlimited, bearing a date of Feb. 3, 2005, pp. 1-4, located at http://www.guardian.co.uk/uk_news/story/0,3604,1404636,00.html, printed on Feb. 4, 2005.

Riviere, Cameron; Taylor, Russ; Digioia, A.; Wenz, J.; Kostuik, J.; Frassica, F.; "Engineered System Family #3: Information-enhanced Minimally Invasive Surgery," pp. 1-12; located at http://cisstweb.cs.jhu.edu/research/InfoEnhMIS/InfoEnhMISMain.htm; printed on Jul. 12, 2004.

Rochester Institute of Technology; "Introduction to Augmented Reality," pp. 1-12; located at http://www.se.rit.edu/~jrv/research/ar/introduction.html; printed on Jul. 12, 2004.

Siggraph Emerging Technologies 1991-2002; "Interactive Paradigm, Technique," pp. 1-5; located at http://www.siggraph.org/~fujii/etech/s_interactive.html; bearing a dated of Jul. 5, 2002; printed on Jul. 12, 2004.

Siggraph Emerging Technologies 1991-2002; "Magic Morphin Mirror: Face-Sensitive Distortion and Exaggeration," pp. 1-2; located at http://siggraph.org/~jujii/etech/1997_190.html; bearing a date of Jul. 5, 2002; printed on Jul. 12, 2004.

Spohrer, J.C.; "Information in places," from vol. 38, allegedly of No. 4, 1999, Pervasive Computing; pp. 1-25; located at http://www.research.ibm.com/journal/sj/384/spohrer.html; printed on Jul. 12, 2004.

Sturm, Peter, "Mixing Catadioptric and Perspective Cameras," pp. 1-8, located at http://www.inrialpes.fr/movi/people/Sturm bearing a date of 2002 and printed on Sep. 1, 2004.

Tan, Kar-Han; Hua, Hong, Ahuja, Narenda "Multiview Panoramic Cameras Using Mirror Pyramids," accepted for publication in the IEEE Transactions on Pattern Analysis and Machine Intelligence journal, pp. 1-19 (+cover sheet), printed on Sep. 1, 2004.

Taniguchi, Rin-Ichiro, "Real-Time Multiview Image Analysis and Its Application," pp. 1-8 printed on Sep. 1, 2004.

The Swiss Technorama Science Center, "Mirrors in Mind: Mirror, Mirror, on the Wall," pp. 1-12, located at http://www.technorama.ch/rentals/description.html printed on Sep. 1, 2004.

TRAXTAL; "What is Augmented Reality," pp. 1-2; located at http://www.traxtal.com/rd/rd_classroom_augmentedreality.htm; printed on Jul. 12, 2004.

* cited by examiner

100
Light Reflecting Structure/ Surface
102
Image Capture Device
104
Input Capture Device
106
Data Presentation Device
210
Captured Input Storage Device
200
Image Transmission Device
208
Image Sorting Engine
212
Surgeon's System (e.g., Cosmetic Surgeon)
Image Storage Device_1
202
Image Storage Device_2
204
Image Storage Device_3
206

100
Light Reflecting Structure/ Surface
102
Image Capture Device
104
Input Capture Device
106
Data Presentation Device
310
Modified Image Reception Device
400
Image Enhancement Engine
208
Image Sorting Engine
Image Storage Device_1
Image Storage Device_2
Image Storage Device_3
202
204
206

100
Light Reflecting Structure/ Surface
102
Image Capture Device
104
Input Capture Device
106
Data Presentation Device
T = t1
502
Image Sequencing/ Presentation Engine
500
Image Registration/ Comparison Engine
310
Modified Image Reception Device
400
Image Enhancement Engine
208
Image Sorting Engine
Image Storage Device_1
Image Storage Device_2
Image Storage Device_3
202
204
206

106
Data Presentation Device
S = s1
106
Data Presentation Device
S = s2
106
Data Presentation Device
S = s3
106
Data Presentation Device
S = s4
Image Sequencing/ Presentation Engine 502
Image Registration/ Comparison Engine 500
Modified Image Reception Device 310
Image Enhancement Engine 400
Image Sorting Engine 208
Image Storage Device_1
Image Storage Device_2
Image Storage Device_3
202
204
206

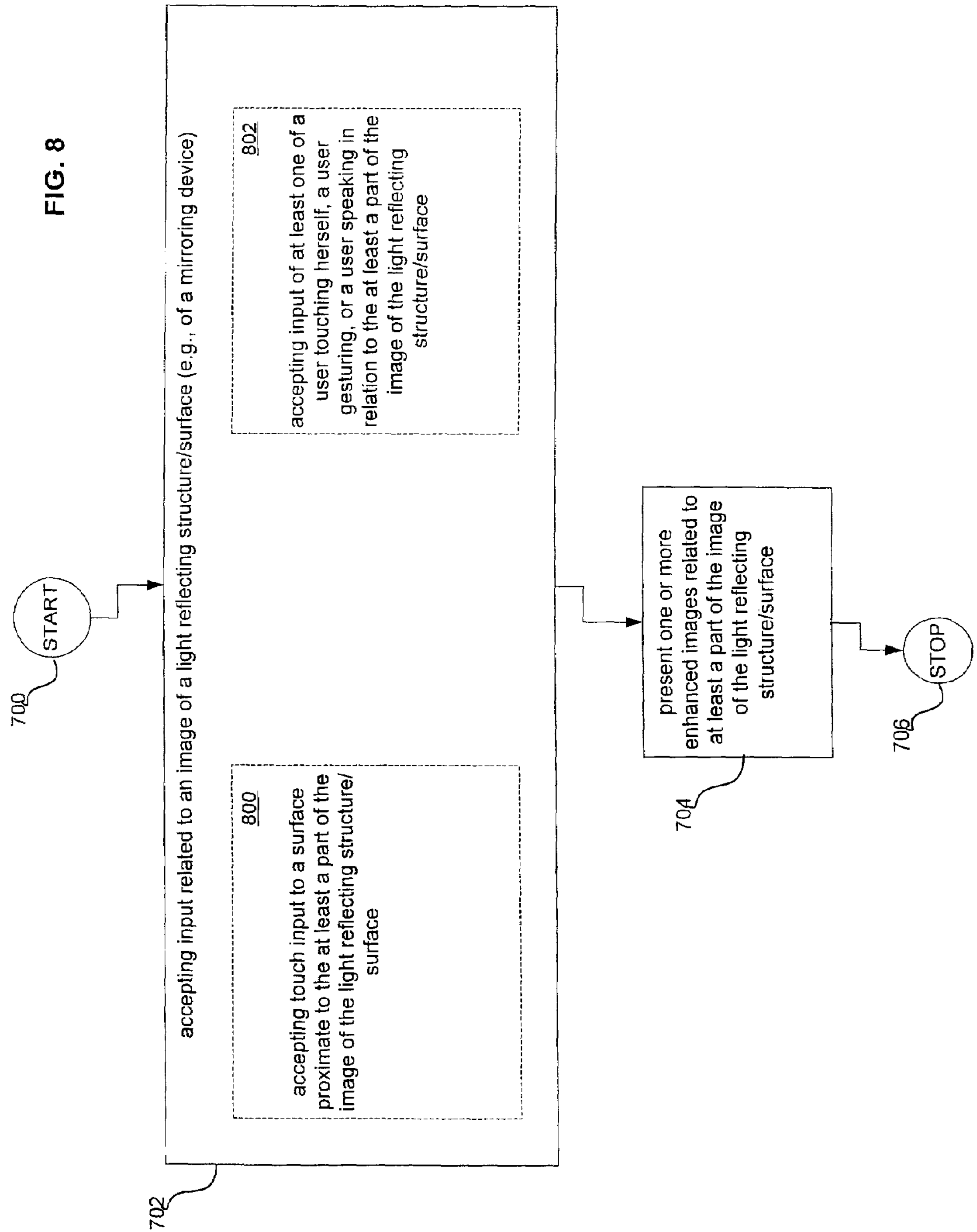
FIG. 8
START
700
accepting input related to an image of a light reflecting structure/surface (e.g., of a mirroring device)
800
accepting touch input to a surface proximate to the at least a part of the image of the light reflecting structure/ surface
802
accepting input of at least one of a user touching herself, a user gesturing, or a user speaking in relation to the at least a part of the image of the light reflecting structure/surface
702
present one or more enhanced images related to at least a part of the image of the light reflecting structure/surface
704
STOP
706

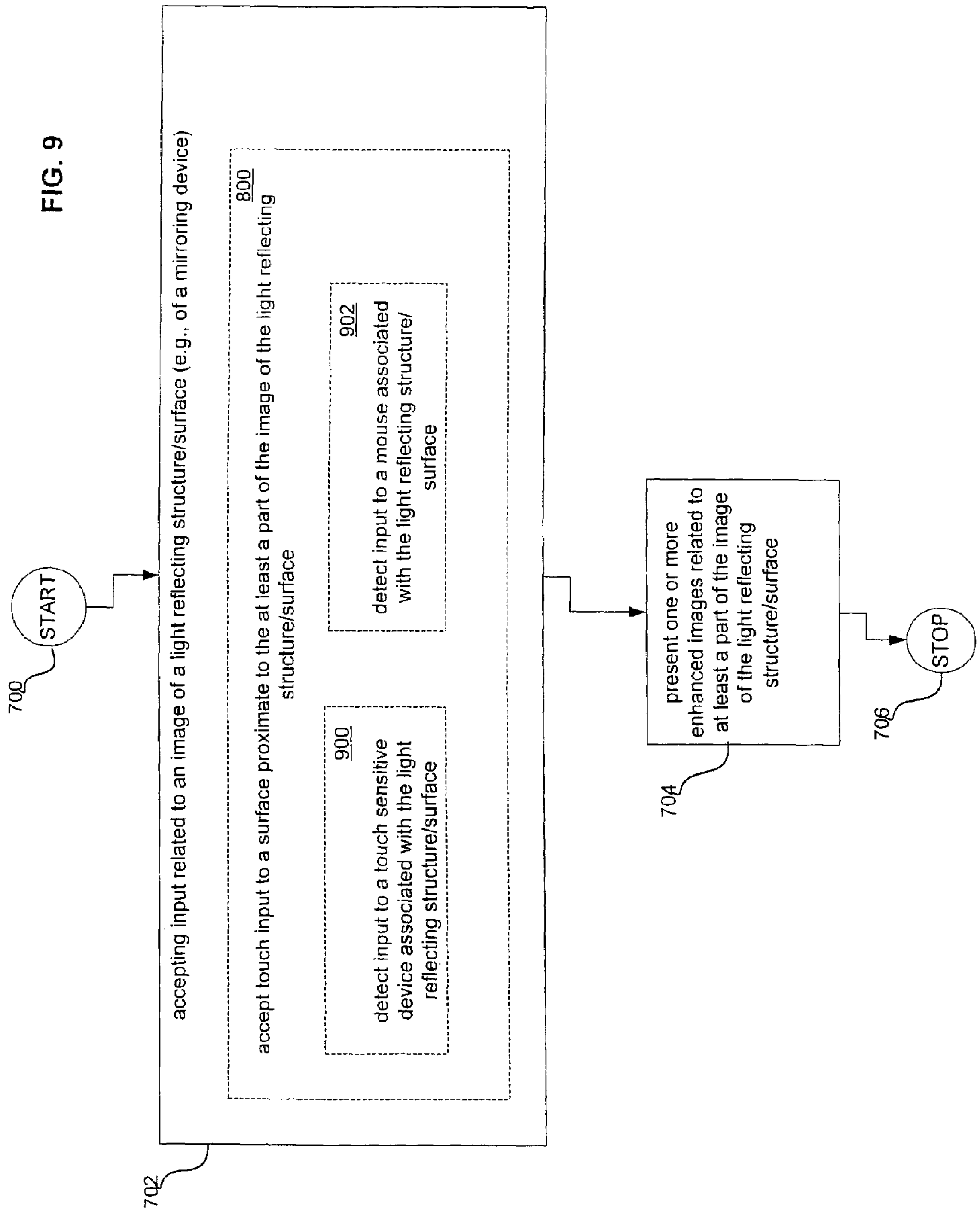
FIG. 9
700
START
accepting input related to an image of a light reflecting structure/surface (e.g., of a mirroring device)
800
accept touch input to a surface proximate to the at least a part of the image of the light reflecting structure/surface
900
detect input to a touch sensitive device associated with the light reflecting structure/surface
902
detect input to a mouse associated with the light reflecting structure/surface
702
present one or more enhanced images related to at least a part of the image of the light reflecting structure/surface
704
STOP
706

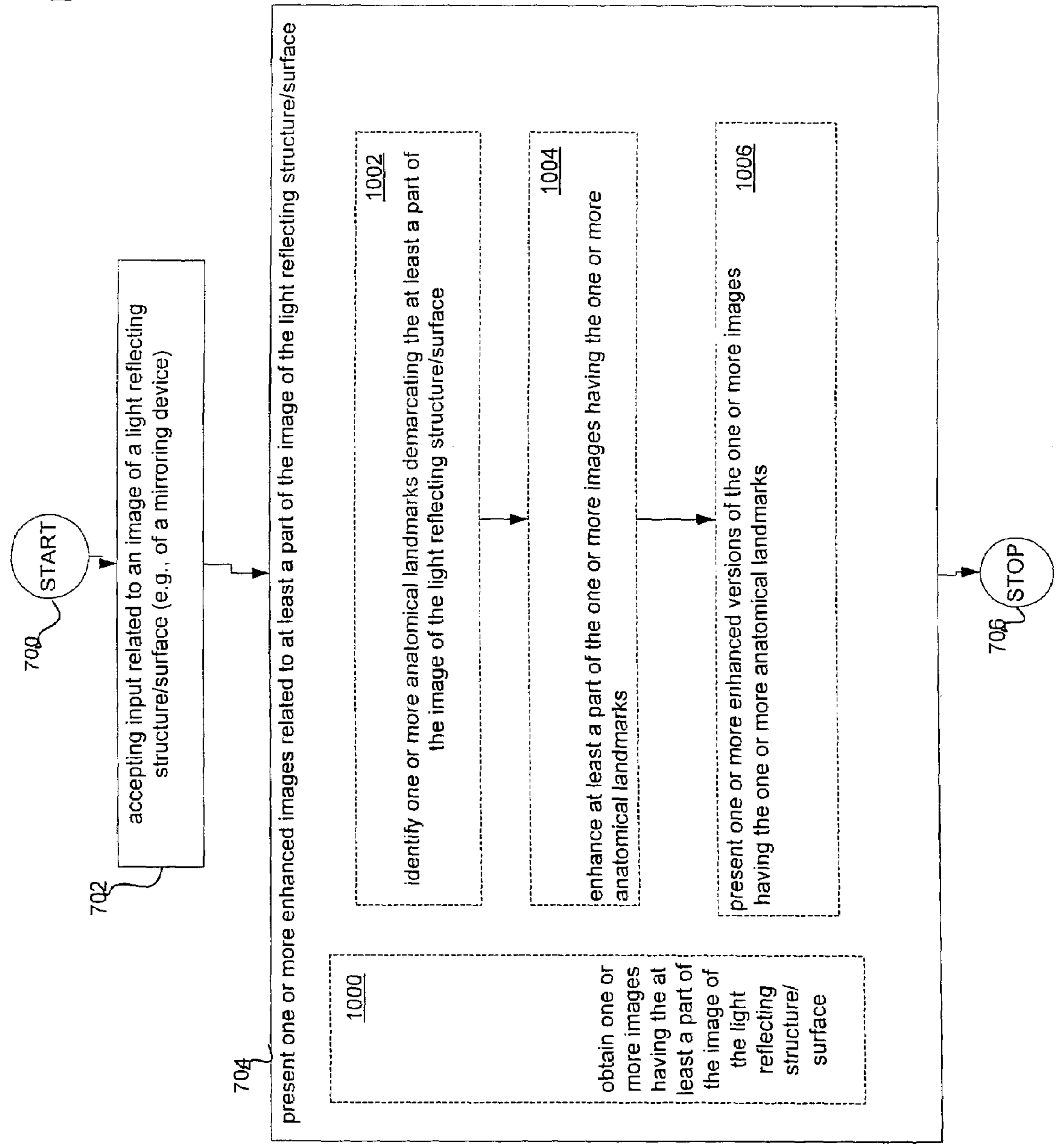
FIG. 10
700
START
702
accepting input related to an image of a light reflecting structure/surface (e.g., of a mirroring device)
704
present one or more enhanced images related to at least a part of the image of the light reflecting structure/surface
1000
obtain one or more images having the at least a part of the image of the light reflecting structure/surface
1002
identify one or more anatomical landmarks demarcating the at least a part of the image of the light reflecting structure/surface
1004
enhance at least a part of the one or more images having the one or more anatomical landmarks
1006
present one or more enhanced versions of the one or more images having the one or more anatomical landmarks
706
STOP

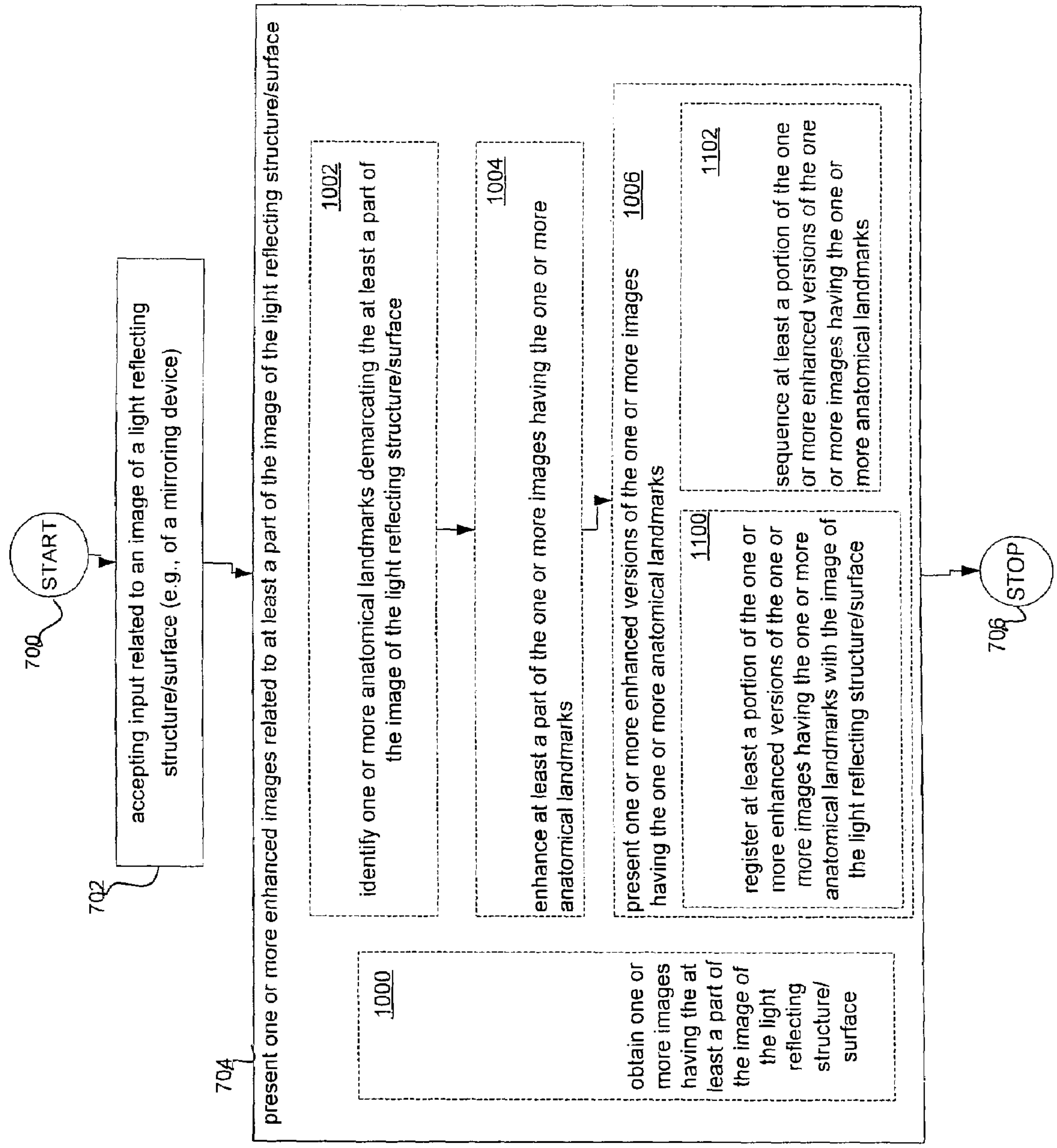
FIG. 11
700
START
702
accepting input related to an image of a light reflecting structure/surface (e.g., of a mirroring device)
704
present one or more enhanced images related to at least a part of the image of the light reflecting structure/surface
1000
obtain one or more images having the at least a part of the image of the light reflecting structure/ surface
1002
identify one or more anatomical landmarks demarcating the at least a part of the image of the light reflecting structure/surface
1004
enhance at least a part of the one or more images having the one or more anatomical landmarks
1006
present one or more enhanced versions of the one or more images having the one or more anatomical landmarks
1100
register at least a portion of the one or more enhanced versions of the one or more images having the one or more anatomical landmarks with the image of the light reflecting structure/surface
1102
sequence at least a portion of the one or more enhanced versions of the one or more images having the one or more anatomical landmarks
706
STOP

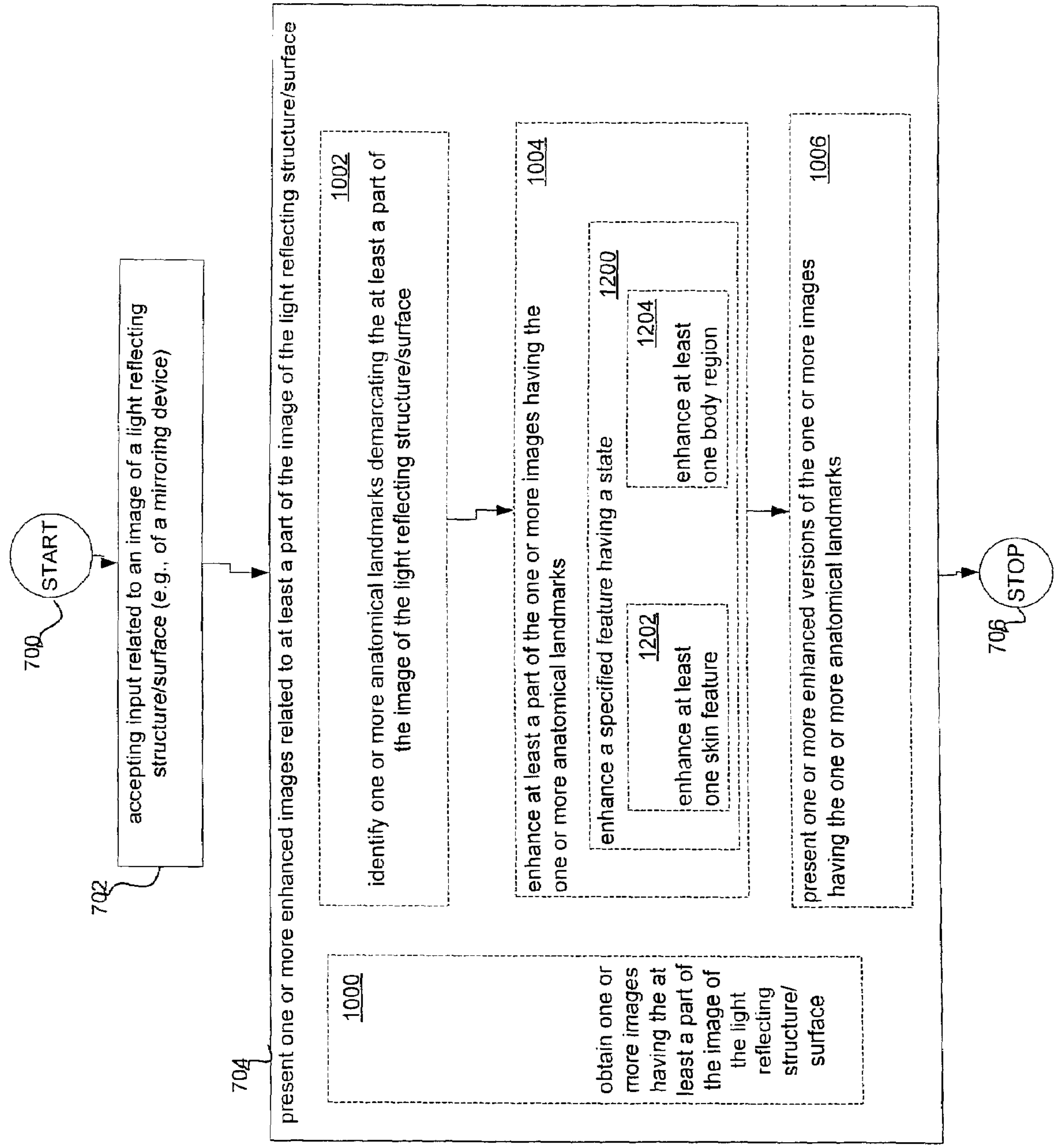
FIG. 12
700
START
702
accepting input related to an image of a light reflecting structure/surface (e.g., of a mirroring device)
704
present one or more enhanced images related to at least a part of the image of the light reflecting structure/surface
1000
obtain one or more images having the at least a part of the image of the light reflecting structure/surface
1002
identify one or more anatomical landmarks demarcating the at least a part of the image of the light reflecting structure/surface
1004
enhance at least a part of the one or more images having the one or more anatomical landmarks
1200
enhance a specified feature having a state
1202
enhance at least one skin feature
1204
enhance at least one body region
1006
present one or more enhanced versions of the one or more images having the one or more anatomical landmarks
706
STOP

COSMETIC ENHANCEMENT MIRROR

CROSS-REFERENCE TO RELATED APPLICATIONS

The present application is related to, claims the earliest available effective filing date(s) from (e.g., claims earliest available priority dates for other than provisional patent applications; claims benefits under 35 USC § 119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith. The United States Patent Office (USPTO) has published a notice to the effect that the USPTO's computer programs require that patent applicants reference both a serial number and indicate whether an application is a continuation or continuation in part (see PTO Gazette Notice 18 Mar. 2003, "Benefit of Prior-Filed Application"). The present applicant entity has provided below a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

RELATED APPLICATIONS

1. The present application constitutes a division of United States patent application entitled COSMETIC ENHANCEMENT MIRROR, U.S. application Ser. No. 10/912,271 naming Paul G. Allen, Edward K. Y. Jung, Royce A. Levien, Mark A. Malamud, and John D. Rinaldo, Jr., as inventors, filed 5 Aug. 2004 now U.S. Pat. No. 7,133,003, which is currently co-pending, or is an application of which a currently co-pending application is entitled to the benefit of the filing date.

2. For purposes of the USPTO extra-statutory requirements, the present application constitutes a continuation in part of United States patent application entitled TIME-LAPSING MIRROR, naming Paul G. Allen, Edward K. Y. Jung, Royce A. Levien, Mark A. Malamud, and John D. Rinaldo, Jr. as inventors, filed 2 Aug. 2004, U.S. application Ser. No. 10/910,421 which is currently co-pending, or is an application of which a currently co-pending application is entitled to the benefit of the filing date.

TECHNICAL FIELD

The present application relates, in general, to mirror technologies.

SUMMARY

In one aspect, a system includes but is not limited to a light reflecting structure; a data presentation device proximate to said light reflecting structure; and an image enhancement engine operably couplable to said data presentation device. In addition to the foregoing, other system aspects are described in the claims, drawings, and text forming a part of the present application.

In one aspect, a system includes but is not limited to a light reflecting surface; an image representation capture device having an image field corresponding to said light reflecting surface; and at least one modified image reception device operably couplable with said image representation capture device. In addition to the foregoing, other system aspects are described in the claims, drawings, and text forming a part of the present application.

In one aspect, a method includes but is not limited to accepting input related to an image of a light reflecting surface; and presenting one or more enhanced images related to at least a part of the image of the light reflecting surface. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the detailed description set forth herein.

BRIEF DESCRIPTION OF THE FIGURES

FIG. 8 shows a high-level logic flowchart depicting alternate implementations of the high-level logic flowchart of FIG. 7.

FIG. 9 depicts a high-level logic flowchart depicting alternate implementations of the high-level logic flowchart of FIG. 8.

FIG. 10 illustrates a high-level logic flowchart depicting alternate implementations of the high-level logic flowchart of FIG. 7.

FIG. 11 shows a high-level logic flowchart depicting alternate implementations of the high-level logic flowchart of FIG. 10.

FIG. 12 illustrates a high-level logic flowchart depicting several alternate implementations of the high-level logic flowchart of FIG. 10.

The use of the same symbols in different drawings typically indicates similar or identical items.

DETAILED DESCRIPTION

Figure 1:
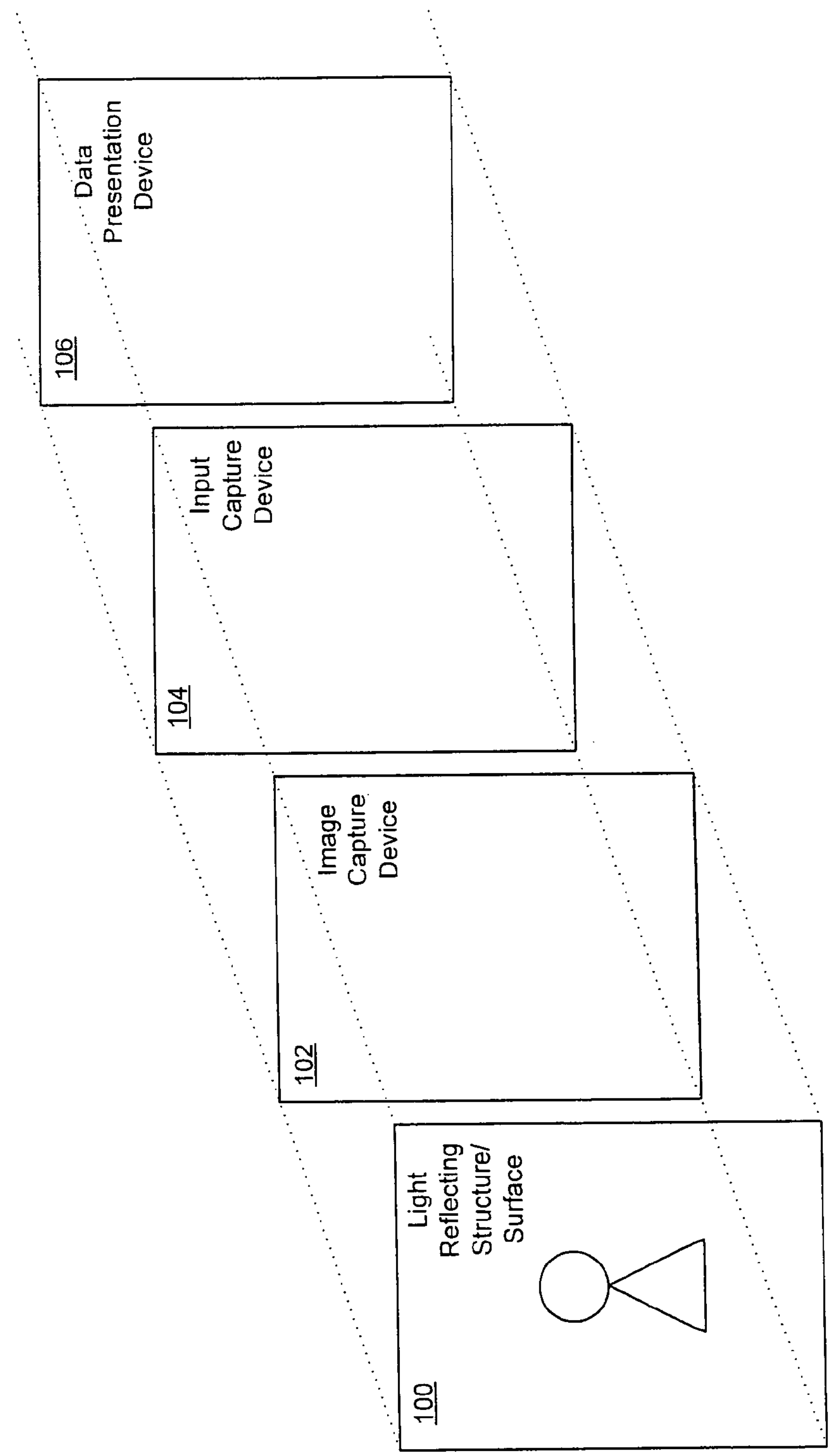
FIG. 1 shows a partial view of a system that may serve as an illustrative environment of and/or for subject matter technologies.

With reference to the figures, and with reference now to FIG. 1, shown is a partial view of a system that may serve as an illustrative environment of and/or for subject matter technologies. Depicted are light reflecting structure/surface 100, image capture device 102, input capture device 104, and data presentation device 106. In one exemplary implementation, light reflecting structure/surface 100 can be a plane mirror, a convex mirror, and/or a concave mirror. In another exemplary implementation, light reflecting structure/surface 100 can be a partially silvered mirror. In some exemplary implementations, light reflecting structure/surface 100 can be a physical mirror. In other exemplary implementations, light reflecting structure/surface 100 can be a digital mirror and/or a projection mirror. In yet other implementations, light reflecting structure/surface 100 can be a combination of one or more physical mirrors and/or one or more digital mirrors and/or one or more projection mirrors. In some implementations, data presentation device 106 may present various types of time-lapse information in addition or in the alternative to image information, such as height and/or weight information. In some implementations, presentations of information may be in the form of various modalities including but not limited to graphs, tables, audio (speech, music, sound), text, email (e.g. a weekly digest), et cetera.

Continuing to refer to FIG. 1, illustrated is data presentation device 106 proximate to light reflecting structure/surface 100. One exemplary implementation of data presentation device 106 proximate to light reflecting structure/surface 100 includes but is not limited to data presentation device 106 integral with light reflecting structure/surface 100. Another exemplary implementation of data presentation device 106 proximate to light reflecting structure/surface 100 includes but is not limited to data presentation device 106 operably coupled with light reflecting structure/surface 100 (e.g., as used herein, proximate may mean operationally proximate—able to work and interact together either directly or through intermediate components—as well as and/or in addition to physically proximate and/or mechanically proximate). Yet another exemplary implementation of data presentation device 106 proximate to light reflecting structure/surface 100 includes but is not limited to data presentation device 106 in physical communication with light reflecting structure/surface 100. One exemplary implementation of data presentation device 106 in physical communication with light reflecting structure/surface 100 includes but is not limited to data presentation device 106 connected with a frame connected with said physical light reflecting structure/surface 100. In some implementations, data presentation device 106 can be a light generation device (e.g., a plasma display and/or a liquid crystal display), an image presentation device (e.g., a direct projection to the eye retinal display), and/or a laser device (e.g., a laser diode device). Those skilled in the art will appreciate that, as used herein, sorting can include categorization, ordering, and/or other operations such as those described herein.

Figure 2:
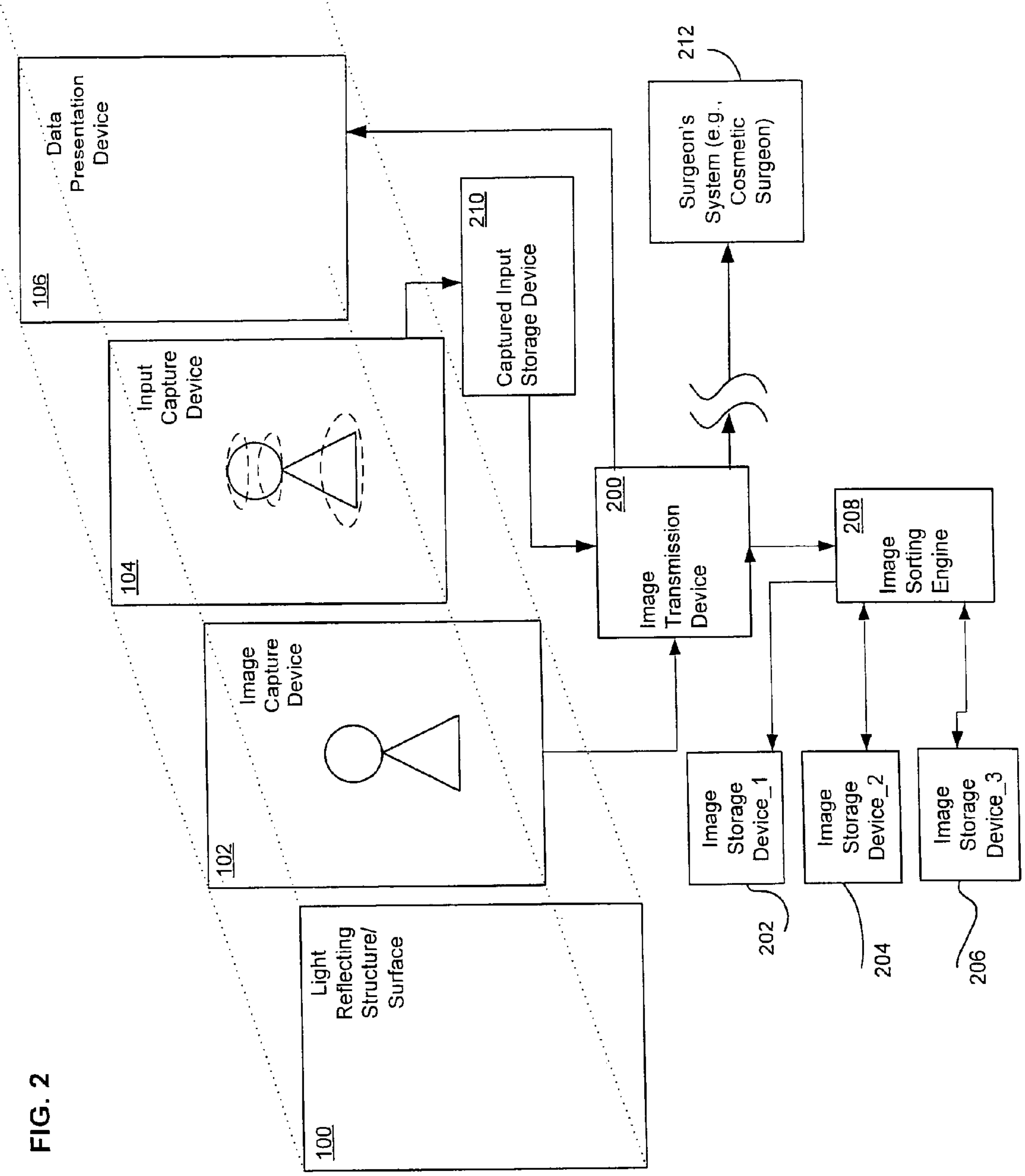
FIG. 2 depicts a partial view of a system that may serve as an illustrative environment of and/or for subject matter technologies.

Referring now to FIG. 2, depicted is a partial view of a system that may serve as an illustrative environment of and/or for subject matter technologies. Illustrated is that image transmission device 200 interfaces with image capture device 102. Shown is that image transmission device 200 interfaces with image storage device_1 202, image storage device_2 204, image storage device_3 206, image sorting engine 208, captured input storage device 210, and surgeon's system 212. In one exemplary implementation, image transmission device 200 receives images from image capture device 102 and user input from captured input storage device 210 and/or input capture device 104. For example, as shown in FIG. 2, a user might submit to input capture device 104 that he desires to see proposed cosmetic enhancements to his upper body, face, and hairline. Thereafter, in one implementation, image transmission device 200 transmits one or more captured images and the user selected image regions wherein enhancement is desired to surgeon's system 212.

In another implementation, image transmission device 200 transmits the one or more images and user selected image regions wherein enhancement is desired to image sorting engine 208. Image sorting engine 208 thereafter sorts the received images into one or more of image storage device_1 202, image storage device_2 204, and image storage device_3 206 based on pattern recognition algorithms and stores the images in association with the user input. For example, in an implementation where image capture device 102 is capturing three-dimensional (3-D) images of a human subject, image sorting engine 208 may utilize 3-D image processing routines to sort various recognized captured images into image storage device_1 202, image storage device_2 204, and image storage device_3 206 (e.g., where images of a first person are sorted to image storage device_1 202, images of a second person are sorted to image storage device_2 204, and images of a third person are sorted to image storage device_3 206).

In yet another implementation, image transmission device 200 interacts with image sorting engine 208 to recall images from one or more of image storage device_1 202, image storage device_2 204, and image storage device_3 206 corresponding to an image in light reflecting structure/surface 100. Thereafter, image transmission device 200 causes a display of those other retrieved images through data presentation device 106. Subsequently, a user may select, through the auspices of input capture device 104, one of those other retrieved images. Thereafter, the user may elect to send the selected images, along with his current image, to surgeon's system 212. For example, a user could send a younger image of himself, along with his current image, to a cosmetic surgeon in order to get a demonstration from that cosmetic surgeon as to how close that surgeon believes that she can come to reconstructing an appearance consonant with the younger image.

Continuing to refer to FIG. 2, in one implementation, image capture device 102 can include at least one image representation device located to capture a field of view of light reflecting structure/surface 100. For example, an active photo-detector array completely and/or partially in identity with a display portion of light reflecting structure/surface 100 or a lensed image capture system oriented such that it could capture all or part of an image reflected from light reflecting structure/surface 100. In another exemplary implementation, image capture device 102 can include at least two image representation devices located to capture a field of view of light reflecting structure/surface 100. For example, two or more camera systems positioned to capture stereo imagery such that 3-D imaging techniques may be applied. The image capture devices described herein can be positioned substantially anywhere an image of light reflecting structure/surface 100 can be captured, such as behind light reflecting structure/surface 100 in order to catch transmitted images through a partially silvered mirror, to the sides and/or above and/or below a mirror, and/or positioned and/or oriented to the front of a mirror in order to record images reflected from a mirror.

Figure 3:
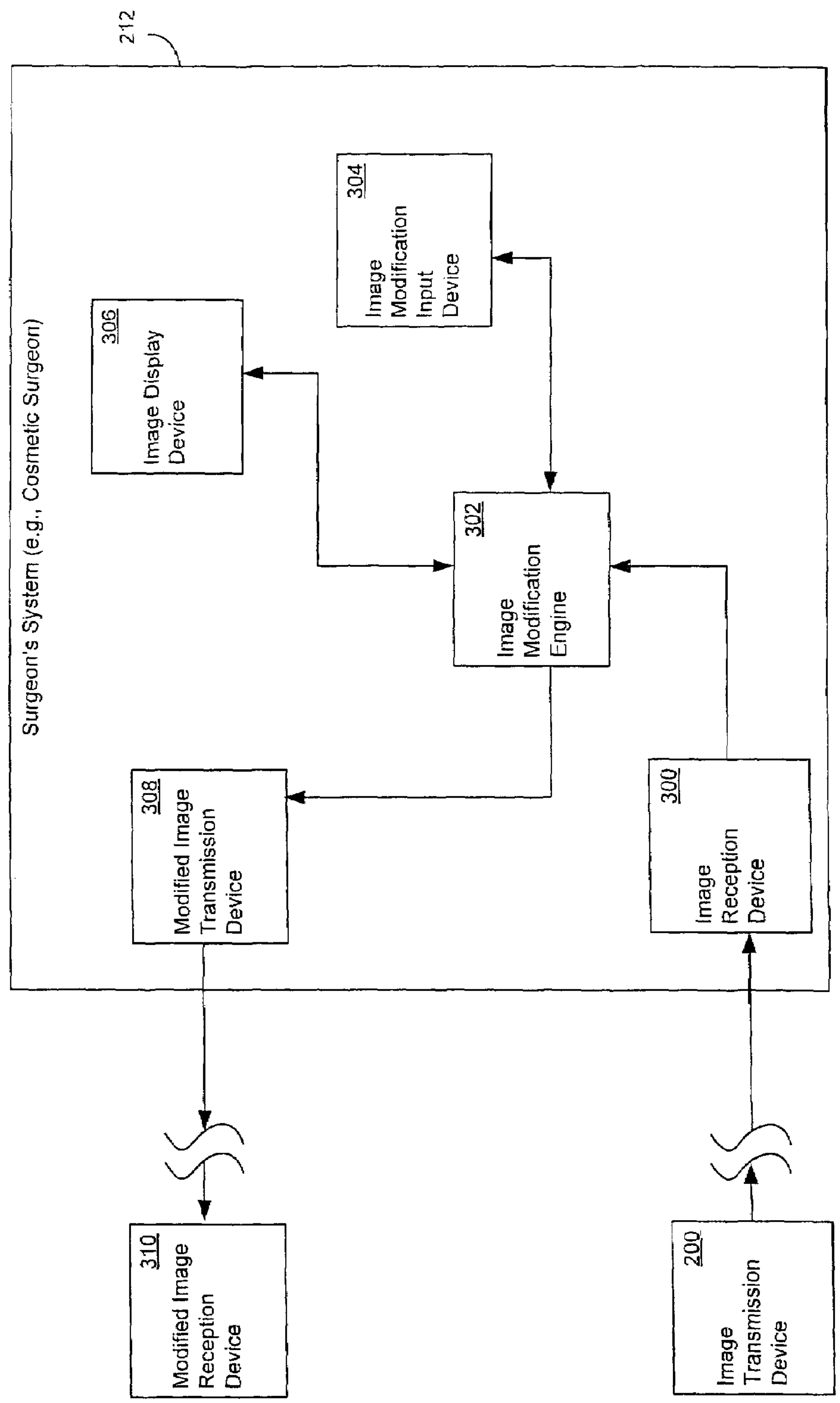
FIG. 3 illustrates a partial view of a system that may serve as an illustrative environment of and/or for subject matter technologies.

With reference now to FIG. 3, illustrated is a partial view of a system that may serve as an illustrative environment of and/or for subject matter technologies. Shown is image transmission device 200 in communication with image reception device 300. Depicted is image reception device 300 interfaced with image modification engine 302. Illustrated is image modification engine 302 interfaced with image modification input device 304, image display device 306, and modified image transmission device 308. Illustrated is modified image transmission device 308 in communication with modified image reception device 310.

In one exemplary implementation, image reception device 300 receives one or more images along with any associated user input(s) from image transmission device 200 (e.g., images with an indication that the user desires that his body, face, and hairline be enhanced). Thereafter, image reception device 300 transmits the received one or more images and any associated user input indicative of desired modification/enhancement to image modification engine 302. In one implementation, image modification engine 302 causes a display of the one or more images and user input indicative of desired modification/enhancement on image display device 306 (e.g., a high-quality computer monitor).

Image modification input device 304 accepts input (e.g., from a cosmetic surgeon) to modify the image of image display device 306. For instance, in one implementation image modification input device 304 provides a graphical user interface and cursor driven input to allow a user (e.g., a cosmetic surgeon) to sculpt the image of image display device 306 in accordance with user input. In response, image modification engine 302 creates a modified version of the displayed image in accord with the input, and displays that modified image back to the surgeon through image display device 306 (often the modified image is displayed in tandem with the unmodified image). Thereafter, the surgeon indicates through image modification input device 304 that the modified image is acceptable, and in response image modification engine 302 causes modified image transmission device 308 to transmit the modified image back to modified image reception device 310.

Figure 4:
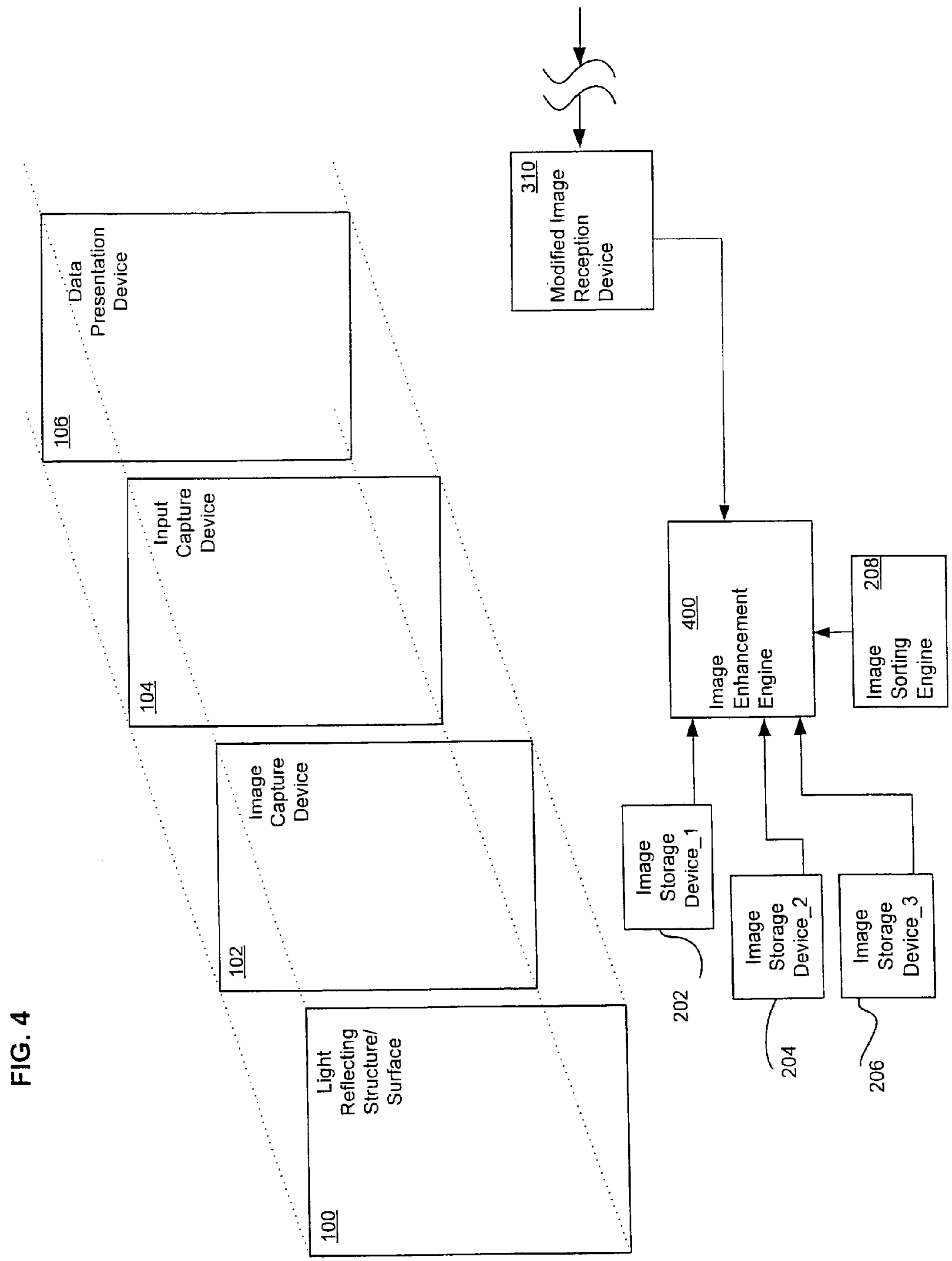
FIG. 4 illustrates a partial view of a system that may serve as an illustrative environment of and/or for subject matter technologies.

Referring now to FIG. 4, illustrated is a partial view of a system that may serve as an illustrative environment of and/or for subject matter technologies. Shown is modified image reception device 310 receiving signals (e.g., such as those sent by modified image transmission device 308 shown/described in FIG. 3). Modified image reception device 310 is shown interfaced with image enhancement engine 400. Image enhancement engine 400 is depicted interfacing with image sorting engine 208, image storage device_1 202, image storage device_2 204, and image storage device_3 206.

In one implementation, image enhancement engine 400 receives one or more modified images from modified image reception device 310. In another implementation, in order to save time/bandwidth, image enhancement engine 400 receives instructions as to how to modify the one or more images, and image enhancement engine 400 thereafter interacts with image sorting engine 208, image storage device_1 202, image storage device_2 204, and image storage device_3 206 to actually generate the modified one or more images locally.

Figure 5:
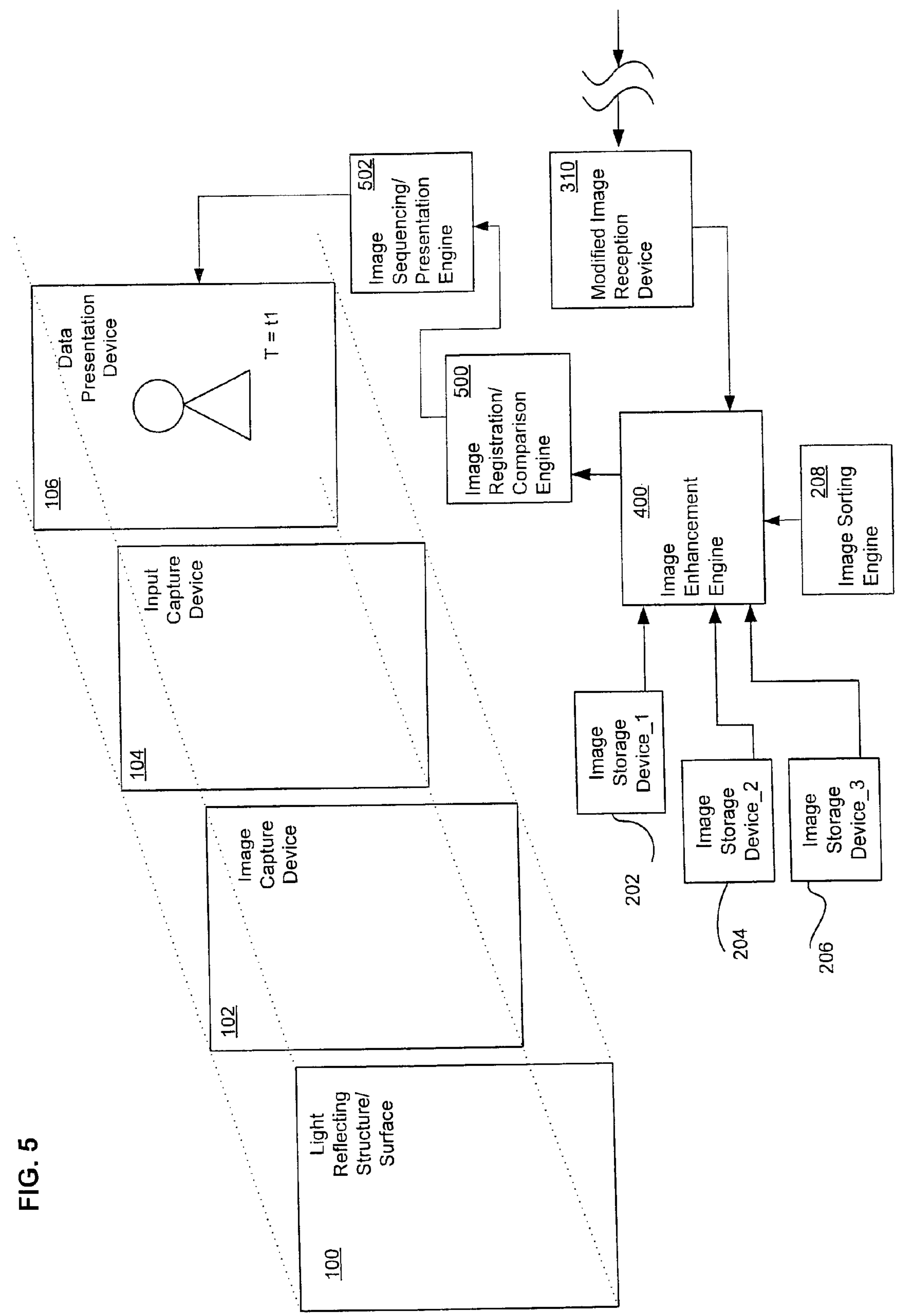
FIG. 5 shows a partial view of a system that may serve as an illustrative environment of and/or for subject matter technologies.

With reference now to FIG. 5, shown is a partial view of a system that may serve as an illustrative environment of and/or for subject matter technologies. Depicted is image enhancement engine 400 interfaced with image registration/comparison engine 500. Shown is image registration/comparison engine 500 interfaced with image sequencing/presentation engine 502. In one exemplary implementation, image enhancement engine 400—in concert with image sorting engine 208—retrieves one or more images from one or more of image storage device_1 202, image storage device_2 204, and image storage device_3 206. Subsequently, image enhancement engine 400 enhances/modifies the one or more retrieved images in accord with modification/enhancement instructions (e.g., such as those received from surgeon's system 212 as described herein. Thereafter, image registration/comparison engine 500 uses some relatively stable image feature(s), such as anatomical landmarks (e.g., bony regions or a center part of some defined anatomical feature, to encompass and or localize a region of interest where some feature of interest resides), to provide proper alignment. In another implementation, image enhancement engine 400 receives images that have already been enhanced by image modification engine 302. Irrespective of whether the enhanced/modified images are generated locally or received in already enhanced/modified form, in one implementation image sequencing/presentation engine 502 then presents the aligned images in a sequenced fashion such that the changes in a region of interest as specified by user input can be viewed. For instance, image sequencing/presentation engine 502 might present a sequenced presentation of various alternate proposed enhancements and/or modifications from the cosmetic surgeon. In another implementation, image sequencing/presentation engine 502 presents a non-sequential menu of options, some which either entail and/or are related to various alternate proposed enhancements and/or modifications from the cosmetic surgeon.

Figure 6:
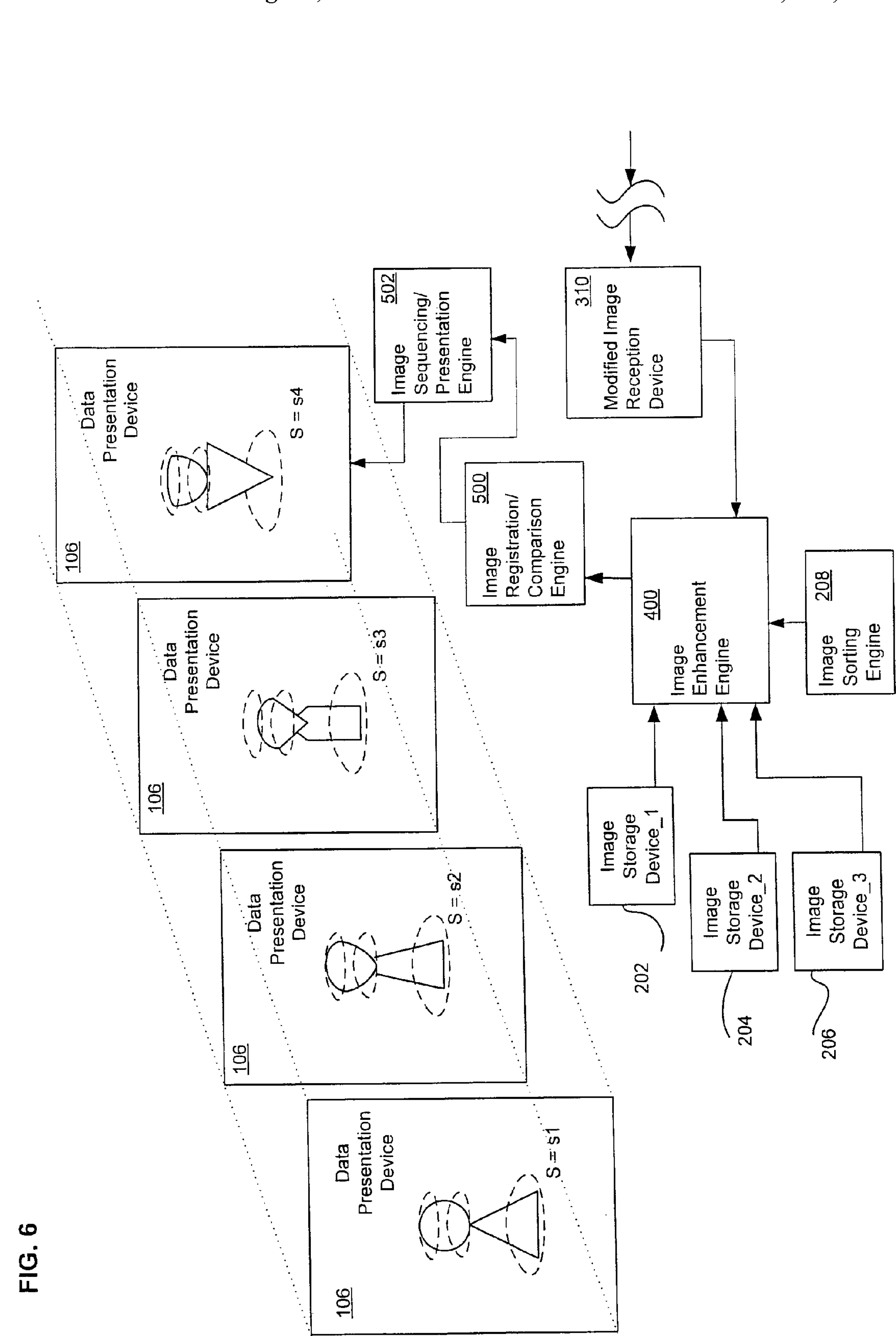
FIG. 6 depicts a partial view of a system that may serve as an illustrative environment of and/or for subject matter technologies

Referring now to FIG. 6, depicted is a partial view of a system that may serve as an illustrative environment of and/or for subject matter technologies. Illustrated is the system presenting four sequenced images showing various proposed enhancements/modifications to a user's captured image. For instance, depicted at sequence event S=s1 is a presentation of the baseline image entered by the user as well as dashed lines representing user input as to where he desires enhancement. Specifically, shown is that the unenhanced image of the user shows a round face and a triangular shaped body. Proposed suggested enhancements to the user are shown at sequence events S=s2 through S=s4. At sequence events S=s2 through S=s4, shown are various presentations of the user's image enhanced and/or modified, such as in accord with the instructions of a cosmetic surgeon as described elsewhere herein. Depicted in FIG. 6 are exemplary representations of a cosmetic surgeon's enhancement to a user's image, where those enhancements are shown in range of effect starting from the user's unmodified image (e.g., S=s1) and ranging to a projected end condition of a classic V-shaped body and more square jaw line (e.g., S=s4).

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 7:
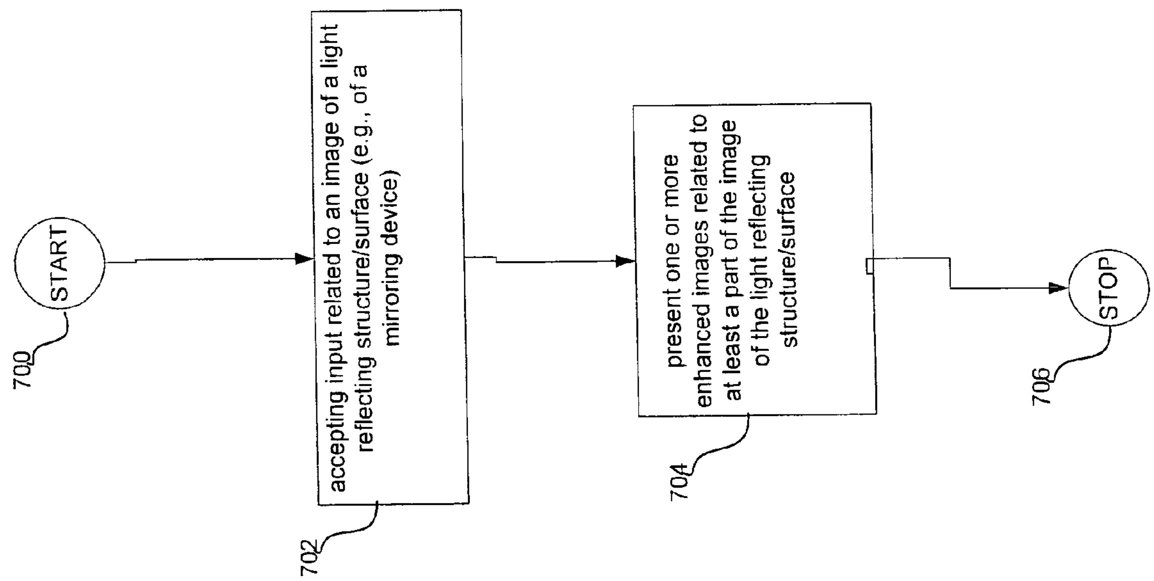
FIG. 7 illustrates a high-level logic flowchart of a process.

Referring now to FIG. 7, illustrated is a high-level logic flowchart of a process. Method step 700 shows the start of the process. Method step 702 shows accepting input related to an image of a light reflecting surface (e.g., via input capture device 104 and/or captured input storage device 210 and/or a supporting component(s) accepting input when a user has indicated one or more portions of an image in light reflecting structure/surface 100). Method step 704 depicts presenting one or more enhanced images related to at least a part of the image of the light reflecting surface (e.g., such as shown/described in relation to FIG. 6). Method step 706 shows the end of the process. Those skilled in the art will appreciate that, in some implementations, the "at least a part of the image" can include but is not limited to a recognized region of an image or a recognized anchor point associated with an image which will provide the ability to do presentation on regions that both are and are not readily visually coordinated with an original field of view of a mirror. For example, in a hand-held mirror implementation, a user might zoom in on a region of an image and then ask to see a time-lapse sequence of images representative of changes in that zoomed-in region, such that the zoomed-in region is not readily visually coordinated with the original unzoomed field of view of the mirror. The inventors point out that those skilled in the art will appreciate that while the zoomed-in region might not be easily visually coordinated with the un-zoomed field of view, in some implementations the use of anchor points will allow coordination between the zoomed and unzoomed views. In addition, the inventors further point out that while examples set forth herein focus on anatomy and/or anatomical change for sake of clarity, the systems described herein can actually track and/or show a time lapse of substantially any object that may be reflected in the mirror.

With reference now to FIG. 8, shown is a high-level logic flowchart depicting alternate implementations of the high-level logic flowchart of FIG. 7. Depicted is that in various alternate implementations, method step 702 includes method step 800 and/or method step 802. Method step 800 shows accepting touch input to a surface proximate to the at least a part of the image of the light reflecting surface (e.g., via input capture device 104 and/or captured input storage device 210 capturing input when a user has indicated one or more portions of an image in light reflecting structure/surface 100) Method step 802 depicts accepting input of at least one of a user touching herself, a user gesturing, or a user speaking in relation to the at least a part of the image of the light reflecting surface (e.g., via input capture device 104 capturing input when a user's gestures or pointing relative to at least a part of an image in light reflecting structure/surface 100 and/or the user speaking a command in relation to at least a part of an image in light reflecting structure/surface 100).

Referring now to FIG. 9, depicted is a high-level logic flowchart depicting alternate implementations of the high-level logic flowchart of FIG. 8. Depicted is that in one alternate implementation, method step 800 includes method step 900 and/or method step 902. Method step 900 shows detecting input to a touch sensitive device associated with the light reflecting surface (e.g. via light reflecting structure/surface 100 and/or input capture device 104 and/or captured input storage device 210 and/or one or more of their supporting components). Method step 902 depicts detecting input to a mouse associated with the light reflecting surface (e.g. via light reflecting structure/surface 100 and/or input capture device 104 and/or captured input storage device 210 and/or one or more of their supporting components).

With reference now to FIG. 10, illustrated is a high-level logic flowchart depicting alternate implementations of the high-level logic flowchart of FIG. 7. Depicted is that in various alternate implementations, method step 704 includes method step 1000, and/or method steps 1002–1006. Method step 1000 shows one alternate implementation of obtaining one or more images having the at least a part of the image of the light reflecting surface. For example, obtaining the one or more images via image modification engine 302, image enhancement engine 400, image sorting engine 208, and/or one or more of image storage devices 202–206.

Continuing to refer to FIG. 10, method steps 1002–1006 depict another alternate embodiment. Method step 1002 illustrates identifying one or more anatomical landmarks demarcating the at least a part of the image of the light reflecting surface (e.g., via image sorting engine 208 and/or image registration/comparison engine 500). Method step 1004 shows enhancing at least a part of the one or more images having the one or more anatomical landmarks (e.g., via image modification engine 302 and/or image enhancement engine 400). Method step 1006 depicts presenting one or more enhanced versions of the one or more images having the one or more anatomical landmarks (e.g., via data presentation device 106 and/or image enhancement engine 400).

Referring now to FIG. 11, shown is a high-level logic flowchart depicting alternate implementations of the high-level logic flowchart of FIG. 10. Depicted is that in various alternate implementations, method step 1006 includes method step 1100 and/or method step 1102. Method step 1100 illustrates registering at least a portion of the one or more enhanced versions of the one or more images having the one or more anatomical landmarks with the image of the light reflecting surface (e.g., via image registration/comparison engine 500). Method step 1102 shows sequencing at least a portion of the one or more enhanced versions of the one or more images having the one or more anatomical landmarks (e.g., via image sequencing/presentation engine 502).

Referring now to FIG. 12, illustrated is a high-level logic flowchart depicting several alternate implementations of the high-level logic flowchart of FIG. 10. Shown is that in one alternate implementation, method step 1004 includes method step 1200. Method step 1200 shows enhancing a specified feature having a state (e.g., via input capture device 102 and/or image modification engine 302 and/or image enhancement engine 400 and/or their supporting components). Further shown is that in one alternate embodiment method stop 1200 can include method step 1202 which depicts enhancing at least one skin feature (e.g., either smoothing wrinkles on the forehead, should that user have indicated via input that his forehead was a region of interest, or enhancing a person's hair count should that user have indicated via input that his thinning hair was an issue). Further shown is that in yet another alternate embodiment method stop 1200 can include method step 1204 which illustrates enhancing at least one body region (e.g., either making more full or less full a user's jowls, should that user have indicated via input that his jowls were a region of interest, or enhancing a person's upper body should that user have indicated via input that his upper body was a region of interest).

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter subject matter described herein applies regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

All of the above U.S. patents, U.S. patent application publications, U.S. patent applications, foreign patents, foreign patent applications and non-patent publications referred to in this specification and/or listed in any Application Data Sheet are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together, etc.).

The invention claimed is:

1. A system comprising:

a light reflecting structure;

a data presentation device proximate to said light reflecting structure;

an image enhancement engine operably couplable to said data presentation device, said image enhancement engine adaptable to respond to one or more modification/enhancement instructions associated with a surgeon and/or one or more modified/enhanced images associated with a surgeon; and further comprising: at least one image capture device operably couplable with said image enhancement engine, wherein said at least one image capture device further comprises: at least one image representation capture device configurable to be located to capture, and alignable relative to, a field of view of said light reflecting surface.

2. The system of claim 1, wherein said light reflecting structure further comprises:

at least one of a plane mirror, a convex mirror, or a concave mirror.

3. The system of claim 1, wherein said light reflecting structure further comprises:

a partially silvered mirror.

4. The system of claim 1, wherein said data presentation device proximate to said light reflecting structure further comprises:

said data presentation device operably couplable with an image sequencing/presentation engine adaptable to supply one or more images modified in accord with one or more modification/enhancement instructions associated with a surgeon and/or one or more modified/enhanced images associated with the surgeon.

5. The system of claim 1, wherein said data presentation device proximate to said light reflecting structure further comprises:

said data presentation device operably couplable with an image sorting engine.

6. The system of claim 5, wherein said data presentation device operably couplable with an image sorting engine further comprises:

said data presentation device operably couplable with an image sorting engine adaptable to sort images utilizing one or more image recognition techniques.

7. The system of claim 5, wherein said data presentation device operably couplable with an image sorting engine further comprises:

said data presentation device operably couplable with an image sorting engine adaptable to sort images to at least two storage devices.

8. The system of claim 1, wherein said data presentation device further comprises:

said data presentation device operably couplable with a modified image reception device adaptable to receive at least one of a modified/enhanced image and/or a modification/enhancement instruction associated with a surgeon.

9. The system of claim 1, further comprising:

at least one image enhancement engine operably couplable with said data presentation device and adaptable to receive one or more modification/enhancement instructions associated with a surgeon and/or one or more modified/enhanced images associated with a surgeon.

10. The system of claim 1, further comprising:

at least one image transmission device operably couplable with an input capture device, said at least one image transmission device adaptable to transmit a captured image to a system associated with a surgeon and/or adaptable to transmit a captured input related to at least one captured image to a system associated with a surgeon.

11. The system of claim 1, wherein said at least one image capture device further comprises:

at least two image representation capture devices alignable relative to a field of view of said light reflecting structure.

12. The system of claim 1, further comprising:

at least one input capture device adaptable to accept one or more surgically-related enhancement requests in relation to a captured image.

13. The system of claim 1, further comprising:

at least one image registration/comparison engine operably couplable with said data presentation device.

14. A system comprising:

a light reflecting surface;

an image representation capture device having an image field corresponding to said light reflecting surface, said image representation capture device configurable to be located to capture, and alignable relative to, a field of view of said light reflecting surface; and at least one modified image reception device operably couplable with said image representation capture device, said at least one modified image reception device adaptable to receive at least one of a modified/enhanced image and/or a modification/enhancement instruction associated with a surgeon.

15. The system of claim 14, wherein said light reflecting surface further comprises:

at least one of a plane mirror, a convex mirror, or a concave mirror.

16. A method comprising:

accepting input related to an image reflected by a light reflecting surface; and presenting one or more enhanced images related to at least a part of the image reflected by the light reflecting surface in response to at least one of a modified/enhanced image associated with a surgeon or a modification/enhancement instruction associated with a surgeon, wherein said presenting one or more enhanced images related to at least a part of the image reflected by the light reflecting surface in response to at least one of a modified/enhanced image associated with a surgeon or a modification/enhancement instruction associated with a surgeon further comprises:

identifying one or more anatomical landmarks demarcating the at least a part of the image reflected by the light reflecting surface;

enhancing at least a part of one or more images having the one or more anatomical landmarks; and presenting one or more enhanced versions of the one or more images having the one or more anatomical landmarks, wherein said presenting one or more enhanced versions of the one or more images having the one or more anatomical landmarks further comprises:

registering at least a portion of the one or more enhanced versions of the one or more images having the one or more anatomical landmarks of the image reflected by the light reflecting surface.

17. The method of claim 16, wherein said accepting input related to an image reflected by a light reflecting surface further comprises:

accepting touch input to a surface proximate to the at least a part of the image reflected by the light reflecting surface, said touch input associated with a surgically-related enhancement request.

18. The method of claim 17, wherein said accepting touch input to a surface proximate to the at least a part of the image reflected by the light reflecting surface further comprises:

detecting input to a touch sensitive device associated with the light reflecting surface, said input to the touch sensitive device associated with a surgically-related enhancement request.

19. The method of claim 16, wherein said accepting input related to an image reflected by a light reflecting surface further comprises:

accepting input of at least one of a user touching herself, a user gesturing, or a user speaking in relation to the at least a part of the image reflected by the light reflecting surface, said input associated with a surgically-related enhancement request.

20. The method of claim 16, wherein said presenting one or more enhanced versions of the one or more images having the one or more anatomical landmarks further comprises:

at least one of sequencing or presenting at least a portion of the one or more enhanced versions of the one or more images having the one or more anatomical landmarks.

21. The method of claim 16, wherein said enhancing at least a part of one or more images having the one or more anatomical landmarks further comprises:

enhancing a specified feature having a state in response to the at least one of the modified/enhanced image associated with the surgeon or the modification/enhancement instruction associated with the surgeon.

22. The method of claim 21, wherein said enhancing a specified feature having a state further comprises:

enhancing at least one skin feature.

23. The method of claim 21, wherein said enhancing a specified feature having a state further comprises:

enhancing at least one body region.

24. A system comprising:

means for accepting input related to an image reflected by a light reflecting surface; and means for presenting one or more enhanced images related to at least a part of the image reflected by the light reflecting surface responsive to at least one of a modified/enhanced image associated with a surgeon or a modification/enhancement instruction associated with a surgeon, wherein said means for presenting one or more enhanced images related to at least a part of the image reflected by the light reflecting surface in response to at least one of a modified/enhanced image associated with a surgeon or a modification/enhancement instruction associated with a surgeon further comprises:

means for identifying one or more anatomical landmarks demarcating the at least a part of the image reflected by the light reflecting surface;

means for enhancing at least a part of one or more images having the one or more anatomical landmarks; and means for presenting one or more enhanced versions of the one or more images having the one or more anatomical landmarks, wherein said means for presenting one or more enhanced versions of the one or more images having the one or more anatomical landmarks further comprises:

means for registering at least a portion of the one or more enhanced versions of the one or more images having the one or more anatomical landmarks of the image reflected by the light reflecting surface.

25. The system of claim 24, wherein said means for accepting input related to an image reflected by a light reflecting surface further comprises:

means for accepting touch input to a surface proximate to the at least a part of the image reflected by the light reflecting surface, said touch input associated with a surgically-related enhancement request.

26. The system of claim 25, wherein said means for accepting touch input to a surface proximate to the at least a part of the image reflected by the light reflecting surface further comprises:

means for detecting input to a touch sensitive device associated with the light reflecting surface, said input to the touch sensitive device associated with a surgically-related enhancement request.

27. The system of claim 24, wherein said means for accepting input related to an image reflected by a light reflecting surface further comprises:

means for accepting input of at least one of a user touching herself, a user gesturing, or a user speaking in relation to the at least a part of the image reflected by the light reflecting surface, said input associated with a surgically-related enhancement request.

28. The system of claim 24, wherein said means for presenting one or more enhanced versions of the one or more images having the one or more anatomical landmarks further comprises:

means for at least one of sequencing or presenting at least a portion of the one or more enhanced versions of the one or more images having the one or more anatomical landmarks.

29. The system of claim 24, wherein said means for enhancing at least a part of one or more images having the one or more anatomical landmarks further comprises:

means for enhancing a specified feature having a state responsive to the at least one of the modified/enhanced image associated with the surgeon or the modification/enhancement instruction associated with the surgeon.

30. The system of claim 29, wherein said means for enhancing a specified feature having a state further comprises:

means for enhancing at least one skin feature.

31. The system of claim 29, wherein said means for enhancing a specified feature having a state further comprises:

means for enhancing at least one body region.

* * * * *